United States Patent
Jung

(10) Patent No.: US 9,660,479 B2
(45) Date of Patent: May 23, 2017

(54) DEVICE AND METHOD FOR WIRELESSLY TRANSMITTING POWER

(71) Applicant: HANRIM POSTECH CO., LTD., Suwon-si, Gyeonggi-do (KR)

(72) Inventor: Chun-Kil Jung, Seoul (KR)

(73) Assignee: HANRIM POSTECH CO., LTD., Suwon-si, Gyeonggi-do (KR)

( * ) Notice: Subject to any disclaimer, the term of this patent is extended or adjusted under 35 U.S.C. 154(b) by 302 days.

(21) Appl. No.: 14/367,889

(22) PCT Filed: Dec. 21, 2012

(86) PCT No.: PCT/KR2012/011322
§ 371 (c)(1),
(2) Date: Jun. 20, 2014

(87) PCT Pub. No.: WO2013/095066
PCT Pub. Date: Jun. 27, 2013

(65) Prior Publication Data
US 2014/0368164 A1 Dec. 18, 2014

Related U.S. Application Data

(60) Provisional application No. 61/579,203, filed on Dec. 22, 2011.

(51) Int. Cl.
*H02J 7/00* (2006.01)
*H02J 7/02* (2016.01)
(Continued)

(52) U.S. Cl.
CPC .............. *H02J 7/025* (2013.01); *H01F 38/14* (2013.01); *H02J 5/005* (2013.01); *H02J 7/00* (2013.01);
(Continued)

(58) Field of Classification Search
CPC ....................................................... H02J 7/025
(Continued)

(56) References Cited

U.S. PATENT DOCUMENTS

2011/0055037 A1* 3/2011 Hayashigawa ....... B60L 3/0069
705/26.1
2011/0115430 A1 5/2011 Saunamäki ................... 320/108
(Continued)

FOREIGN PATENT DOCUMENTS

CN 101147308 A 3/2008
CN 101919139 A 12/2010
(Continued)

OTHER PUBLICATIONS

English Translation of JP 2005-143181 A.*
(Continued)

*Primary Examiner* — Suresh Memula
(74) *Attorney, Agent, or Firm* — Envision USA Inc.

(57) ABSTRACT

There is provided a wireless power transmitting device capable of simply being carried by a user and wirelessly transmitting a power to a power receiving device with a high transmission efficiency regardless of time and space. The wireless power transmitting device includes a power storage unit configured to store a direct current power, and a power transmitting unit configured to be operated by the direct current power stored in the power storage unit and to wirelessly transmit the power to a power receiving device.

19 Claims, 13 Drawing Sheets

(51) Int. Cl.
*H02J 5/00* (2016.01)
*H01F 38/14* (2006.01)

(52) U.S. Cl.
CPC ............... *H02J 2007/0001* (2013.01); *H02J 2007/0059* (2013.01)

(58) Field of Classification Search
USPC .......................................................... 320/108
See application file for complete search history.

(56) References Cited

U.S. PATENT DOCUMENTS

| | | | | |
|---|---|---|---|---|
| 2011/0156635 | A1* | 6/2011 | Hong ...................... | H02J 5/005 320/107 |
| 2011/0260681 | A1 | 10/2011 | Guccione et al. ............ | 320/108 |
| 2014/0139180 | A1* | 5/2014 | Kim ........................ | H02J 7/025 320/108 |

FOREIGN PATENT DOCUMENTS

| | | |
|---|---|---|
| JP | 2000-268883 A | 9/2000 |
| JP | 2005-20963 A | 1/2005 |
| JP | 2005-143181 A | 6/2005 |
| JP | 3115477 U | 9/2005 |
| JP | 2006-141170 A | 6/2006 |
| JP | 2011-41351 A | 2/2011 |
| JP | 2011-155018 A | 8/2011 |
| JP | 2011-176972 A | 9/2011 |
| JP | 2012-511891 A | 5/2012 |
| KR | 10-2008-0036702 A | 4/2008 |
| KR | 10-0976120 B1 | 8/2010 |
| WO | WO 2010/068062 A2 | 6/2010 |

OTHER PUBLICATIONS

English Translation of JP 2006-141170 A.*
English Translation of JP KR 10-0976120 B1.*
International Search Report mailed Apr. 24, 2013, issued in corresponding International Application No. PCT/KR2012/011322.
International Search report dated Apr. 24, 2013, issued in corresponding International Application No. PCT/KR2012/011322.
Chinese Office Action issued by the Chinese Patent Office, dated Nov. 17, 2015 in corresponding application No. 201280070037.0.

* cited by examiner

DEVICE AND METHOD FOR WIRELESSLY TRANSMITTING POWER

CROSS-REFERENCE TO RELATED APPLICATIONS

This application is a national stage of International Application No. PCT/KR2012/011322, filed Dec. 21, 2012, which claims priority to U.S. Provisional Application No. 61/579,203, filed Dec. 22, 2011. All disclosures of the documents named above are incorporated herein by reference.

BACKGROUND OF THE INVENTION

Field of the Invention

The present invention relates to a device and a method for wirelessly transmitting a power capable of easily being carried by a user and wirelessly transmitting a power to a power receiving device regardless of time or location.

Description of the Background Art

In general, a power receiving device for supplying an operating power is attached to various mobile terminals such as a cellular phone or a PDA (Personal Digital Assistant).

The power receiving device receives a power supplied from an external charging device, and supplies the received power to the mobile terminal as the operating power.

The power receiving device may include a battery that is charged with the power, and a charging/discharging circuit that receives the power supplied from the external charging device to charge the battery with the power, and that discharges the power charged in the battery to supply the discharged power to the mobile terminal as the operating power.

As a method for electrically connecting the charging device with the power receiving device, a terminal connecting method which directly connects a power output terminal of the charging device to a power input terminal of the power receiving device through a cable and a connector is widely known.

The power output terminal of the charging device and the power input terminal of the power receiving device have different potentials from each other.

Accordingly, when a terminal of the charging device from which the power is output and a terminal of the power receiving device to which the power is input are connected to each other or are separated from each other, instantaneous discharging may be caused due to a potential difference.

The instantaneous discharging causes abrasion in the terminal of the charging device and the terminal of the power receiving device. Further, when a foreign substance exists in the terminal of the charging device or the terminal of the power receiving device, heat is generated in the foreign substance due to the instantaneous discharging, so that there is a concern that a negligent accident such as fire may occur.

Furthermore, the power charged in the battery of the power receiving device is naturally discharged to the outside through the terminal of the power receiving device due to moisture, so that a lifespan of the power receiving device may be shortened, and performance thereof may be degraded.

In recent years, in order to solve various problems of the terminal connecting method, a wireless power transmitting device that wirelessly transmits the power to the power receiving device has been proposed.

The wireless power transmitting device wirelessly transmits the power by using, for example, an electromagnetic induction method. The power receiving device receives the power that is wirelessly transmitted from the wireless power transmitting device, and charges the battery with the received power.

Much research and development has gone into allowing the wireless power transmitting device to stably transmit the power with a high efficiency in a wireless manner and allowing the power receiving device to receive the power transmitted from the wireless power transmitting device to charge the battery with the power.

The wireless power transmitting device is typically operated by an alternating current power input from the outside to wirelessly transmit the power to the power receiving device.

Accordingly, the wireless power transmitting device can wirelessly transmit the power to the power receiving device only in a place where the alternating current power is supplied from the outside, and does not wirelessly transmit the power to the power receiving device in a place where the alternating current power is not supplied.

SUMMARY OF THE INVENTION

Technical Problem

An object of the present invention is to provide a device and a method for wirelessly transmitting a power capable of easily being carried by a user and wirelessly transmitting a power to a power receiving device regardless of time or location.

Another object of the present invention is to provide a device and a method capable of wirelessly transmitting a power to a power receiving device by storing the power to a power storage unit and using the power stored in the power storage unit.

Another object of the present invention is to provide a device and a method for wirelessly transmitting a power which receives the power from the outside in a wired or wireless manner to store the power in the power storage unit.

The objects of the present invention are not limited to the aforementioned technical objects, and other technical objects that are not mentioned should be clearly understood by those skilled in the art from the following description.

Technical Solution

An exemplary embodiment of the present invention provides a wireless power transmitting device including a power storage unit configured to store a direct current power; and a power transmitting unit configured to be operated by the direct current power stored in the power storage unit and to wirelessly transmit the power to a power receiving device.

The power storage unit and the power transmitting unit may be respectively provided in separate cases, and may be connected by a cable.

The power storage unit and the power transmitting unit may be integrally provided in a single case.

The power storage unit and the power transmitting unit may be respectively provided in separate cases, and may be slidably combined.

The power storage unit may further include an alternating/direct current converter configured to convert an external alternating current power to a direct current power; a battery configured to store the direct current power and to output the stored direct current power to the power transmitting unit; and a charging unit configured to charge the battery with the direct current power converted by the alternating/direct current converter under the control of the power transmitting unit.

The power storage unit may include a power receiving coil configured to wirelessly receive an external alternating current power; a rectifier configured to rectify the alternating current power received by the power receiving coil to the direct current power; a battery configured to store the direct current power and to output the stored direct current power to the power transmitting unit; and a charging unit configured to charge the battery with the direct current power rectified by the rectifier under the control of the power transmitting unit.

The power storage unit further may include an alternating/direct current converter configured to convert the external alternating current power into the direct current power; and a power transmitting switch that is provided between the alternating/direct current converter and the charging unit to be switched under the control of the power transmitting unit.

The power storage unit further may include a first signal receiving unit configured to receive a signal transmitted from an external wireless power transmitting device through the power receiving coil to provide the received signal to the power transmitting unit; and a first signal transmitting unit configured to transmit a signal generated by the power transmitting unit to the outside through the power receiving coil.

The power transmitting unit may include a power transmitting coil configured to wirelessly transmit an alternating current power; and a power transmitting controller configured to apply the alternating current power to the power transmitting coil to control such that the applied alternating current is transmitted.

The power transmitting unit further may include a driving driver configured to amplify a PWM driving signal generated by the power transmitting controller; and a series resonance type converter configured to switch the direct current power stored in the power storage unit to generate the alternating current power in response to the PWM signal amplified by the driving driver, and to apply the generated alternating current power to the power transmitting coil.

The power transmitting unit further may include a second signal receiving unit configured to receive a signal transmitted from the power receiving device through the power transmitting coil to provide the received signal to the power transmitting controller; and a second signal transmitting unit configured to transmit a signal generated by the power transmitting controller to the power receiving device through the power transmitting coil.

Another exemplary embodiment of the present invention provides a method for wirelessly transmitting a power. The method includes charging a battery with a power received by a power receiving coil from the outside under the control of a power transmitting controller; and applying the power charged in the battery to a power transmitting coil under the control of the power transmitting controller to wirelessly transmit the power to the outside.

The operation of charging a battery with a power received by a power receiving coil from the outside under the control of a power transmitting controller may include transmitting, by the power transmitting controller, an ID signal when an ID request signal is received, and determining whether the power is received through the power receiving coil; and when the power is received, charging the battery with the received power.

The method may further include charging, by the power transmitting controller, the battery with an output power of an alternating/direct current converter when the power is not received by the power receiving coil from the outside.

The method may further include determining, by the power transmitting controller, a power charging status of the battery; and generating, by the power transmitting controller, a charging status signal including the power charging status to transmit the generated charging status signal to the outside through the power receiving coil.

The operation of applying the power charged in the battery to a power transmitting coil under the control of the power transmitting controller to wirelessly transmit the power to the outside may include detecting a power receiving device through the power transmitting coil; converting the power charged in the battery into an alternating current power under the control of the power transmitting controller when the power receiving device is detected; and applying the converted alternating current power to the power transmitting coil to wirelessly transmit the alternating current power to the outside.

Still another exemplary embodiment of the present invention provides a wireless power transmitting device including a power transmitting coil configured to wirelessly transmit a power and to wirelessly receive the power; a power storage unit configured to store the power received by the power transmitting coil; and a power transmitting controller configured to control the power received by the power transmitting coil to be stored in the power storage unit, and to apply the power stored in the power storage unit to the power transmitting coil to wirelessly transmit the power to the outside.

The power storage unit may include a rectifier configured to rectify the power received by the power transmitting coil to a direct current power; a battery configured to store the power; and a charging unit configured to charge the battery with the direct current power rectified by the rectifier under the control of the power transmitting controller.

The power storage unit further may include an alternating/direct current converter configured to convert an alternating current power into a direct current power; and a power transmitting switch configured to output the converted direct current power by the alternating/direct current converter to the charging unit under the control of power transmitting controller.

Still another exemplary embodiment of the present invention provides a wireless power transmitting device that may further include a driving driver configured to amplify a PWM driving signal generated by the power transmitting controller; a series resonance converter configured to switch the direct current power stored in the power storage unit to generate the alternating current power in response to the PWM signal amplified by the driving driver, and to apply the generated alternating current power to the power transmitting coil; and a transmitting/receiving switch configured to be switched under the control of the power transmitting controller to apply the alternating current power generated by the series resonance converter to the power transmitting coil, and to output the power received by the power transmitting coil to the power storage unit.

Still another exemplary embodiment of the present invention provides a method for wirelessly transmitting a power. The method includes storing a power received through a power transmitting coil from the outside in a power storage unit under the control of a power transmitting controller; and applying the power stored in the power storage unit to the power transmitting coil to wirelessly transmit the power to the outside under the control of the power transmitting controller.

The operation of storing a power received through a power transmitting coil from the outside in a power storage unit under the control of a power transmitting controller may include transmitting, by the power transmitting controller, an ID signal through a power transmitting coil when an ID request signal is received, and determining whether the power is received through the power transmitting coil; and when the power is received, charging a battery with the received power.

Still another exemplary embodiment of the present invention provides a method for wirelessly transmitting a power. The method may further include charging, by the power transmitting controller, the battery with an output power of an alternating/direct current converter when the power is not received by the power transmitting coil from the outside.

Still another exemplary embodiment of the present invention provides a method for wirelessly transmitting a power. The method may further include determining, by the power transmitting controller, a power charging status of the battery; and generating, by the power transmitting controller, a charging status signal including the power charge status to transmit the generated charging status signal to the outside through the power receiving coil.

The operation of applying the power stored in the power storage unit to the power transmitting coil to wirelessly transmit the power to the outside under the control of the power transmitting controller may include detecting a power receiving device through the power transmitting coil: and applying the power charged in the battery to the power transmitting coil to wirelessly transmit the power to the outside under the control of the power transmitting controller when the power receiving device is detected.

Advantageous Effects

According to a wireless power transmitting device of the present invention, a power storage unit is provided to charge a power, and a power transmitting unit is operated by the power charged in the power storage unit to wirelessly transmit the power to a power receiving device.

Accordingly, a user can easily carry the wireless power transmitting device and wirelessly transmit the power to the power receiving device regardless of time or location.

BRIEF DESCRIPTION OF THE DRAWINGS

Hereinafter, the present invention will be described in more detail, in connection with embodiments that do not limit the present invention, with reference to the accompanying drawings, and the same part will be assigned the same reference numeral in the drawings.

DETAILED DESCRIPTION OF THE EMBODIMENTS

The following detailed description is merely an example, and is merely illustrative of embodiments of the present invention. Further, the principle and concept of the present invention are provided for the purpose of the most useful and easy description.

Therefore, it is appreciated that detailed structures unnecessary to understand the essential features of the present invention have not been provided, and various embodiments that are implemented by those skilled in the art in the substance of the present invention are exemplified through the drawings.

Figure 1:
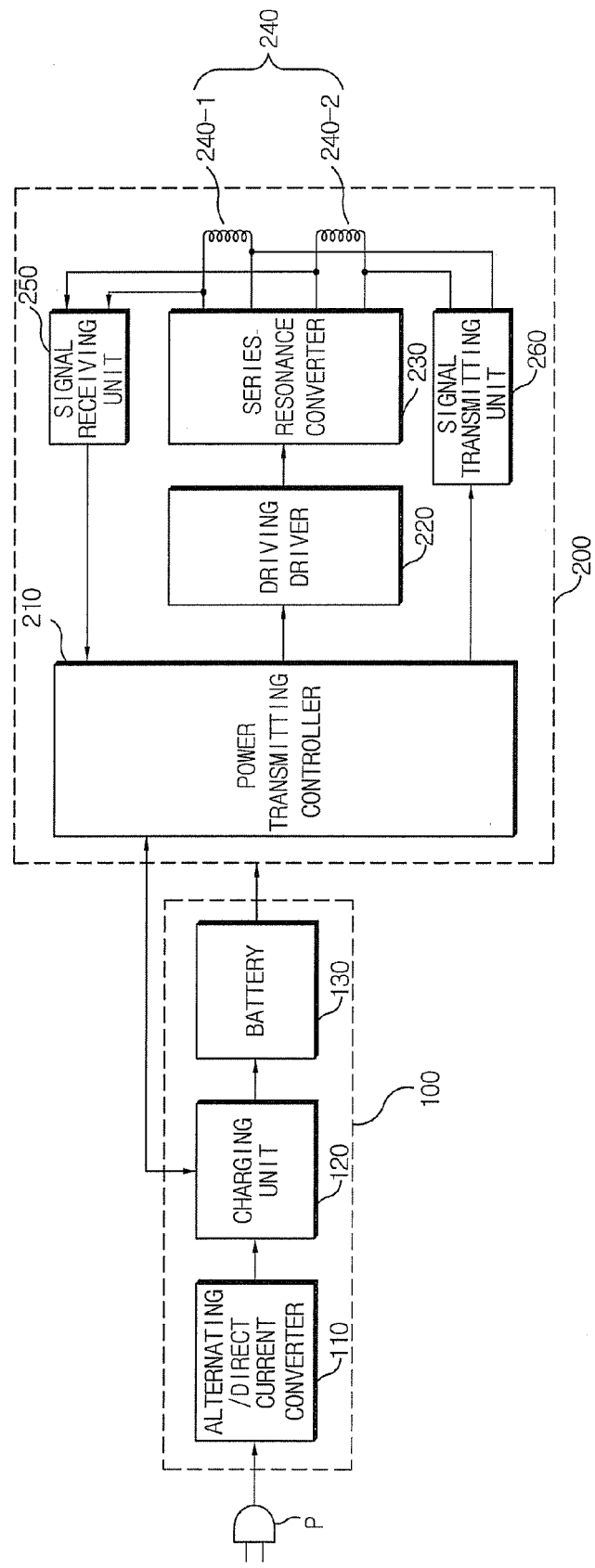
FIG. 1 is a block diagram illustrating a configuration of one embodiment of a wireless power transmitting device of the present invention.

FIG. 1 is a block diagram illustrating a configuration of one embodiment of a wireless power transmitting device of the present invention. Here, reference numeral 100 denotes a power storage unit that stores a power, and reference numeral 200 denotes a power transmitting unit that is operated by the power stored in the power storage unit 100 to wirelessly transmit the power to a power receiving device (not illustrated in the drawing).

The power storage unit 100 may include an alternating/direct current converter 110, a charging unit 120, and a battery 130.

The alternating/direct current converter 110 converts an alternating current power input through a power plug P from the outside into a direct current power.

The charging unit 120 is configured to charge the battery 130 with the direct current power output from the alternating/direct current converter 110 under the control of the power transmitting unit 200, and provides power charging information of the battery 130 to the power transmitting unit 200.

The battery 130 supplies the charged power to the power transmitting unit 200, as an operating power.

The power transmitting unit 200 may include a power transmitting controller 210, a driving driver 220, a series resonance converter 230, a plurality of power transmitting coils 240 (240-1, 240-2), a signal receiving unit 250, and a signal transmitting unit 260.

The power transmitting controller 210 generates an ID request signal to request an ID signal to the power receiving device, and generates a driving signal to wirelessly transmit the power to the power receiving device when the ID signal is received from the power receiving device. For example, the power transmitting controller 210 generates a PWM (Pulse Width Modulation) driving signal to control such that the power is wirelessly transmitted to the power receiving device.

Furthermore, when a charging status signal is received from the power receiving device, the power transmitting controller 210 controls such that the power is wirelessly transmitted to the power receiving device in response to the received charge status signal.

The driving driver 220 amplifies the PWM driving signal generated by the power transmitting controller 210.

The series resonance converter 230 switches the direct current power supplied from the power charging unit 100 to generate an alternating current power in response to the PWM driving signal amplified by the driving driver 220, and outputs the generated alternating current power to the power transmitting coil 240 to wirelessly transmit the power to the power receiving device.

The signal receiving unit 250 receives the ID signal and the charging status signal transmitted from the power receiving device through the power transmitting coil 240 to output the received ID signal and charging status signal to the power transmitting controller 210.

The signal transmitting unit 260 transmits the ID request signal generated by the power transmitting controller 210 to the power receiving device through the power transmitting coil 240.

According to the embodiment of the wireless power transmitting device of the present invention having the aforementioned configuration, when the alternating current power is input from the outside through the power plug P, the alternating/direct current converter 110 of the power storage unit 100 converts the alternating current power into the direct current power, and outputs the converted direct current power to the charging unit 120.

The power transmitting controller 210 of the power transmitting unit 200 monitors the charging unit 120 to determine whether or not the direct current power is input from the alternating/direct current converter 110, and when the direct current power is input, the power transmitting controller 210 controls the charging unit 120 to charge the battery 130 with the direct current power.

Furthermore, the power transmitting controller 210 receives the power charging information from the charging unit 120 to determine a power charging status of the battery 130. When it is determined that the power charging of the battery 130 is completed, the power transmitting controller 210 controls the charging unit 120 to stop the power charging such that the battery 130 is not overcharged.

As described above, the power charged in the battery 130 is supplied to the power transmitting unit 200 as the operating power.

Meanwhile, in order for the power transmitting controller 210 of the power transmitting unit 200 to wirelessly transmit the power to the power receiving device, it is necessary to determine whether or not the power receiving device is placed on the power transmitting coil 240.

To achieve this, the power transmitting controller 210 generates a load detecting driving signal for detecting whether or not a load of the power transmitting coil 240 is changed. The load detecting driving signal is amplified by the driving driver 220 to be input to the series resonance converter 230.

The series resonance converter 230 switches the operating power supplied from the battery 130 to generate the alternating current power in response to the load detecting driving signal, and the generated alternating current power is applied to the power transmitting coil 240.

Here, the load detecting driving signal has a high frequency of, for example, about 180 kHz which does not cause resonance in the power transmitting coil 240.

Accordingly, the series resonance converter 230 switches the direct current power to generate the alternating current power in response to the load detecting driving signal, and even though the generated alternating current power is applied to the power transmitting coil 240, since the resonance does not occur in the power transmitting coil 240, power consumption is very low, and the alternating current power is rarely transmitted in a wireless manner.

In this state, the signal receiving unit 250 receives a signal of the power transmitting coil 240, and outputs the received signal to the power transmitting controller 210. The power transmitting controller 210 determines whether or not the load is changed by using frequency of the received signal input from the signal receiving unit 250.

That is, when the load is not placed on the power transmitting coil 240, the frequency of the alternating current power applied to the power transmitting coil 240 is rarely changed.

However, when the load is placed on the power transmitting coil 240, an impedance is changed between the power transmitting coil 240 and the load, and the frequency of the alternating current power applied to the power transmitting coil 240 is changed depending on the change of the impedance.

The power transmitting controller 210 determines whether or not the frequency of the signal input from the signal receiving unit 250 is changed, and when the frequency is changed, it is determined that the load such as the power receiving device is placed on the power transmitting coil 240.

That is, when the frequency of the signal input from the signal receiving unit 250 and the frequency of the load detecting driving signal are different from each other, the power transmitting controller 210 determines that the load is placed on the power transmitting coil 240.

When it is determined that the load is placed on the power transmitting coil 240, the power transmitting controller 210 needs to determine whether or not the load is the power receiving device.

To achieve this, the power transmitting controller 210 generates the ID request signal for requesting the ID signal of the power receiving device, and the generated ID request signal is transmitted to the load through the signal transmitting unit 260 and the power transmitting coil 240.

Moreover, the power transmitting controller 210 receives the signal of the signal receiving unit 250 to determine whether or not the ID signal is received.

That is, when the load placed on the power transmitting coil 240 is the power receiving device, the power receiving device transmits the ID signal in response to the ID request signal. The ID signal transmitted from the power receiving device is received by the signal receiving unit 250 through the power transmitting coil 240 to be output to the power transmitting controller 210, and the power transmitting controller 210 receives the signal of the signal receiving unit 250 to determine whether or not the ID signal is received.

When the ID signal is received, the power transmitting controller 210 determines that the load placed on the power transmitting coil 240 is the power receiving device. The power transmitting controller 210 generates the PWM driving signal for wirelessly transmitting the power, and the generated PWM driving signal is amplified by the driving driver 220 and is input to the series resonance converter 230.

The series resonance converter 230 switches the direct current power of the battery 130 to generate the alternating current power in response to the PWM driving signal, and the generated alternating power is applied to the power transmitting coil 240.

Here, the power transmitting coil 240 is designed to cause the resonance in a frequency of 100 kHz, for example, and the power transmitting controller 210 generates the PWM driving signal having a frequency of 100 kHz.

The series resonance converter 230 switches the direct current power to generate the alternating current power of 100 kHz in response to the PWM driving signal of 100 kHz, and the generated alternating current power of 100 kHz is applied to the power transmitting coil 240. Thus, the power transmitting coil 240 causes the resonance by the alternating current power of 100 kHz.

When the resonance occurs in the power transmitting coil 240, a large amount of current flows to the power transmitting coil 240 to allow the alternating current power to be wirelessly transmitted to the power receiving device.

In this state, the power receiving device detects the power charging status to generate the charging status signal, and transmits the generated charging status signal. The power transmitting controller 210 receives the charging status signal received by the signal receiving unit 250 to determine whether or not the power receiving device is overheated or the power charging of the power receiving device is completed.

When it is determined that the power receiving device is overheated, the power transmitting controller 210 adjusts the frequency of the PWM control signal. That is, the power transmitting controller 210 generates the PWM control signal having a frequency which is slightly deviated from a resonance frequency of the power transmitting coil 240.

As the power transmitting controller 210 adjusts the frequency of the PWM control signal, the alternating current power applied to the power transmitting coil 240 is slightly deviated from a resonance point of the power transmitting coil 240. Thus, a magnitude of the power that is wirelessly transmitted to the power receiving device from the power transmitting coil 240 is decreased, so that the power receiving device is prevented from being overheated.

In addition, when it is determined that the power charging of the power receiving device is completed by using the charging status signal, the power transmitting controller 210 does not generate the PWM driving signal, and ends the operation of wirelessly transmitting the power to the power receiving device.

Figure 2A:
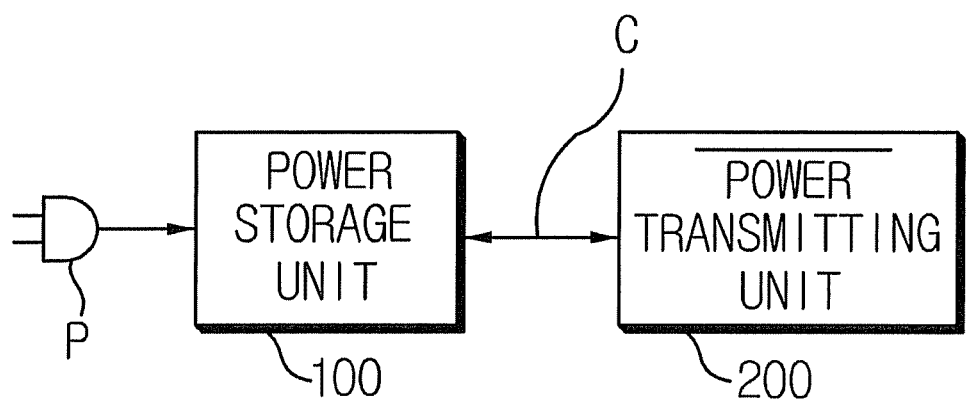
FIGS. 2A to 2C are diagrams describing usage examples of the one embodiment of the wireless power transmitting device of the present invention.

According to the one embodiment of the wireless power transmitting device of the present invention, the power charging unit 100 and the power transmitting unit 200 may be respectively provided in separate cases, as illustrated in FIG. 2A, and the power charging unit 100 converts the alternating current power input through the power plug P into the direct current power to charge the battery. Further, the power charging unit 100 and the power transmitting unit 200 may be connected to each other by a cable C to allow the direct current power charged in the power charging unit 100 to be supplied to the power transmitting unit 200.

In this case, a user simply can carry the wireless power transmitting device while separating the power charging unit 100 from the power transmitting unit 200, and use the wireless power transmitting device while connecting the power charging unit 100 to the power transmitting unit 200 by the cable C when charging the power receiving unit with the power.

Figure 2B:
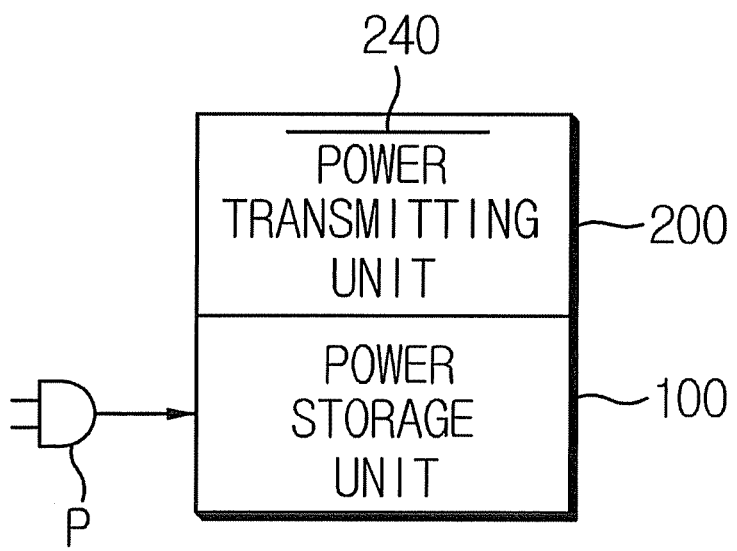

According to an alternative embodiment of the wireless power transmitting device of the present invention, the power charging unit 100 and the power transmitting unit 200 may be integrally provided in a single case, as illustrated in FIG. 2B.

Figure 2C:
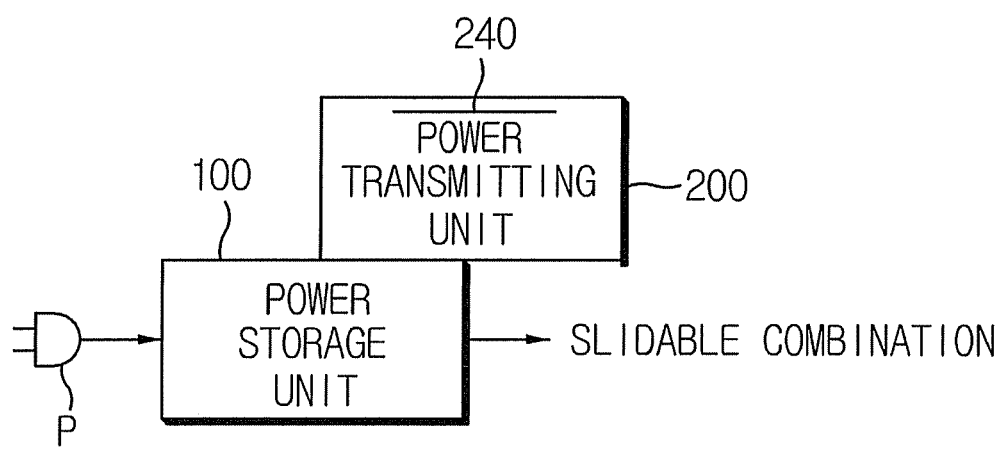

Moreover, according to an alternative embodiment of the wireless power transmitting device of the present invention, the power charging unit 100 and the power transmitting unit 200 may be separated from each other and slidably combined with each other, as illustrated in FIG. 2C. In addition, when the power charging unit 100 and the power transmitting unit 200 are slidably combined, the power charging unit and the power transmitting unit may be connected through a contact point (not illustrated in the drawing) to allow the power charging unit 100 to supply the operating power to the power transmitting unit 200.

Similar to the embodiment depicted in FIG. 2A, the user can simply carry the wireless power transmitting device while separating the power charging unit 100 from the power transmitting unit 200, and use the wireless power transmitting device while slidably combining the power charging unit 100 and the power transmitting unit 200 when charging the power receiving device with the power.

Figure 3:
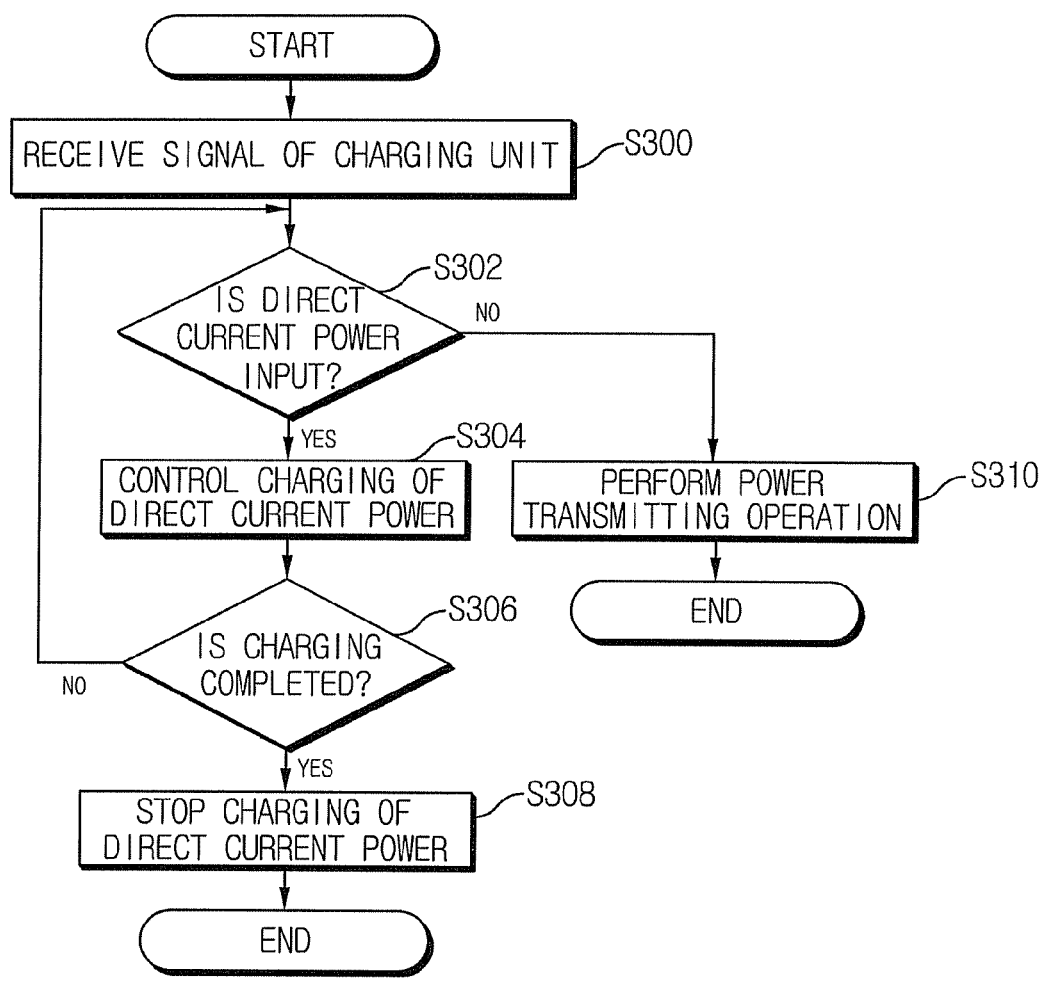
FIG. 3 is a signal flowchart illustrating an operation of a power transmitting controller according to one embodiment of a method for wirelessly transmitting a power of the present invention.

FIG. 3 is a signal flowchart illustrating an operation of the power transmitting controller according to one embodiment of a method for wirelessly transmitting a power of the present invention. Referring to FIG. 3, the power transmitting controller 210 receives the signal of the charging unit 120 (S300). Further, the power transmitting controller 210 determines whether or not the direct current power is input to the charging unit 120 from the alternating/direct current converter 110 by using the signal of the charging unit 120 (S302).

When it is determined that the direct current power is input to the charging unit 120 from the alternating/direct current converter 110, the power transmitting controller 210 controls the charging unit 120 to charge the battery 130 with the direct current power (S304), and determines whether or not the charging of the battery 130 is completed (S306).

As the determining result, when the charging of the battery 130 is not completed, the power transmitting controller 210 is returned to the operation S302 to repeatedly perform the operation of controlling the charging unit 120 to charge the battery 130 with the direct current power input from the alternating/direct current converter 110 and determining whether or not the charging of the battery 130 is completed.

In this state, when the charging of the battery 130 is completed, the power transmitting controller 210 controls the charging unit 120 to stop the charging of the battery 130 by the direct current power (S308) such that the battery 130 is not overcharged.

In addition, in the operation S302, when the direct current power is not input to the charging unit 120 from the alternating/direct current converter 110, the power transmitting controller 210 performs a power transmitting operation of wirelessly transmitting the power to the power receiving device (S310).

In the above embodiments of the present invention, it has been described that the operation of charging the battery 130 with the power and the operation of wirelessly transmitting the power through the power transmitting coil 240 are separately performed by the power transmitting controller 210.

In implementing the present invention, the operation of charging the battery 130 with the power and the operation of wirelessly transmitting the power through the power transmitting coil 240 may be simultaneously performed by the power transmitting controller 210.

Figure 4:
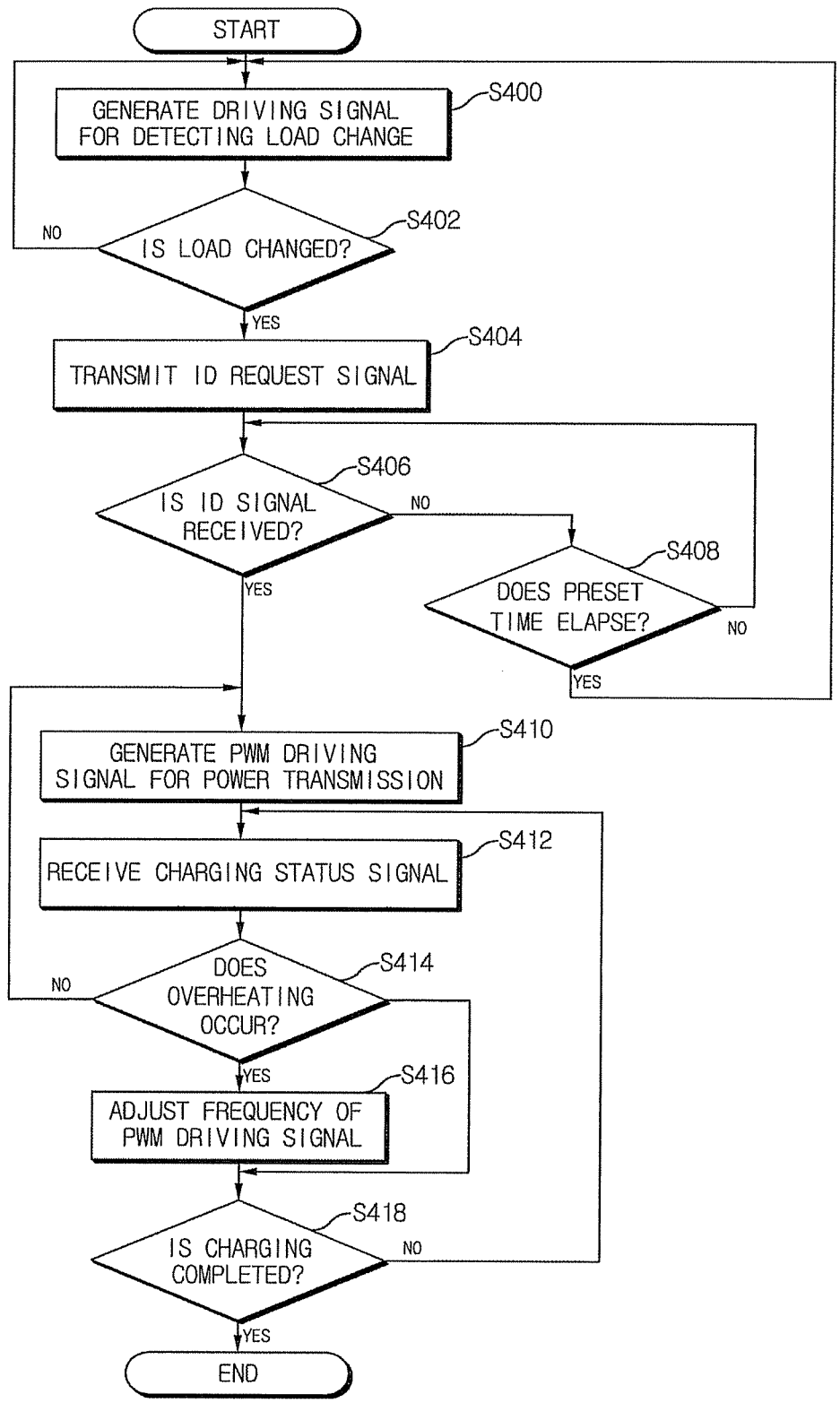
FIG. 4 is a signal flowchart illustrating a power transmitting operation in the method for wirelessly transmitting a power of the present invention.

As illustrated in FIG. 4, in the power transmitting operation, the power transmitting controller 210 generates the load detecting driving signal for detecting the change of the load (S400).

The load detecting driving signal generated by the power transmitting controller 210 is amplified by the driving driver 220 and is input to the series resonance converter 230. The series resonance converter 230 switches the direct current power of the battery 130 to generate the alternating current power in response to the load detecting driving signal, and the generated alternating current power is applied to the power transmitting coil 240.

In such a state, the signal receiving unit 250 receives the signal of the power transmitting coil 240, and outputs the received signal to the power transmitting controller 210.

The power transmitting controller 210 detects the frequency of the signal input from the signal receiving unit 250 to determine whether or not the load is changed (S402).

As the determining result, when the load is not changed, the power transmitting controller 210 is returned to the operation S400 to repeatedly perform the operation of generating the load detecting driving signal for detecting the change of the load and detecting the frequency of the signal received by the signal receiving unit 250 to determine whether or not the load is changed.

Further, when the change of the load is detected in the operation S402, the power transmitting controller 210 generates the ID request signal for requesting the ID signal of the power receiving device, and the generated ID request signal is transmitted to the power receiving device through the signal transmitting unit 260 and the power transmitting coil 240 (S404).

In such a state, the power transmitting controller 210 receives the received signal of the signal receiving unit 250 to determine whether or not the ID signal is received from the power receiving device (S406).

As the determining result, when the ID signal is not received, the power transmitting controller 210 determines whether or not a preset time elapses (S408).

When the preset time does not elapse, the power transmitting controller is returned to the operation S406 to repeatedly perform the operation of determining whether or not the ID signal is received from the power receiving device.

Furthermore, even though the preset time elapses, when the ID signal is not received, since a foreign substance other than the power receiving device is placed on the power transmitting coil 240, the power transmitting controller 210 is returned to the operation S400 to repeatedly perform the operation of generating the load detecting driving signal.

Moreover, when the ID signal is received before the preset time elapses, the power transmitting controller 210 determines that the power receiving device is placed on the power transmitting coil 240, and generates the PWM driving signal for wirelessly transmitting the power (S410).

The PWM driving signal generated by the power transmitting controller 210 is amplified by the driving driver 220, and is input to the series resonance converter 230 to generate the alternating current power, and the generated alternating current power is applied to the power transmitting coil 240 to wirelessly transmit the power to the power receiving device.

In this state, the power transmitting controller 210 receives the charging status signal transmitted by the power receiving device through the signal receiving unit 250 (S412), and analyzes the received charging status signal to determine whether or not the power receiving device is overheated (S414).

As the determining result, when the power receiving device is overheated, the power transmitting controller 210 adjusts the frequency of the PWM driving signal to prevent the overheating (S416).

Furthermore, the power transmitting controller 210 determines whether or not the power charging of the power receiving device is completed by using the charging status signal (S418).

When the power charging of the power receiving device is not completed, the power transmitting controller 210 is returned to the operation S412 to perform the operation of receiving the charging status signal transmitted by the power receiving device and determining whether or not the power charging of the power receiving device is completed using the received charging status signal. When the power charging of the power receiving device is completed, the power transmitting controller ends the operation of transmitting the power.

Figure 5:
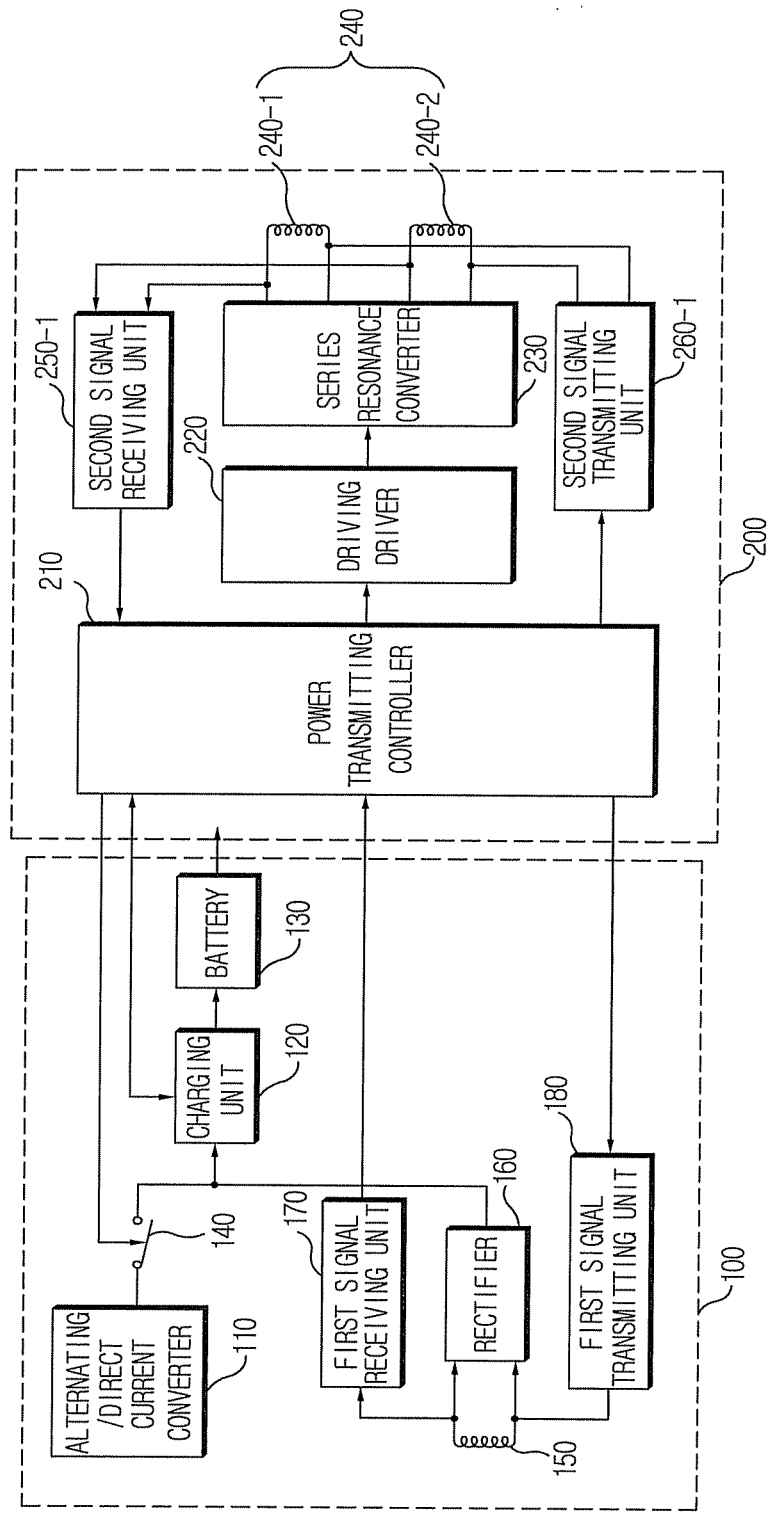
FIG. 5 is a block diagram illustrating a configuration of another embodiment of the wireless power transmitting device of the present invention.

FIG. 5 is a block diagram illustrating a configuration of another embodiment of the wireless power transmitting device of the present invention. The another embodiment of the wireless power transmitting device of the present invention is different from aforementioned embodiments in that the power storage unit 100 may further include a power supply switch 140, a power receiving coil 150, a rectifier 160, a first signal receiving unit 170, and a first signal transmitting unit 180.

The power supply switch 140 is provided between the alternating/direct current converter 110 and the charging unit 120, and is switched under the control of the power transmitting controller 210 to input or block the direct current power output from the alternating/direct current converter 110 to the charging unit 120.

The power receiving coil 150 receives the alternating current power that is wirelessly transmitted from the outside.

The rectifier 160 converts the alternating current power received by the power receiving coil 150 into the direct current power to output the converted direct current power to the charging unit 120.

The first signal receiving unit 170 receives the ID request signal through the power receiving coil 150 to output the received ID request signal to the power transmitting controller 210.

The first signal transmitting unit 180 transmits the ID signal and the charging status signal generated by the power transmitting controller 210 to the outside through the power receiving coil 150.

In the another embodiment of the wireless power transmitting device of the present invention having the aforementioned configuration, the power transmitting controller 210 controls the power supply switch 140 to connect.

In this state, the alternating current power input from the outside through the power plug P is converted into the direct current power by the alternating/direct current converter 110, and the converted direct current power is provided to the charging unit 120 through the power supply switch 140.

The power transmitting controller 210 receives the signal of the charging unit 120 to determine whether or not the direct current power is input from the alternating/direct current converter 110, and when the direct current power is input, the power transmitting controller controls the charging unit 120 to charge the battery 130 with the direct current power.

Furthermore, the power transmitting controller 210 receives the received signal of the first signal receiving unit 170 to determine whether or not the ID request signal is received.

That is, when an external wireless power transmitting device (not illustrated in the drawing) wirelessly transmits a power signal, the ID request signal is firstly transmitted, and the transmitted ID request signal is received by the first signal receiving unit 170 through the power receiving coil 150 to be input to the power transmitting controller 210. The power transmitting controller 210 receives the received signal of the first receiving unit 170 to determine whether or not the ID request signal is received.

When the ID request signal is received, the power transmitting controller 210 opens the power supply switch 140 to block the direct current power output from the alternating/direct current converter 110 not to be input to the charging unit 120.

Moreover, the power transmitting controller 210 generates a unique ID signal assigned to the power transmitting controller, and the generated ID signal is transmitted to the external wireless power transmitting device through the first signal transmitting unit 180 and the power receiving coil 150.

In this state, when the external wireless power transmitting device wirelessly transmits the power signal, the power receiving coil 150 receives the transmitted power signal, and the rectifier 160 converts the received power signal into the direct current power to output the converted direct current power to the charging unit 120.

In such a state, the power transmitting controller 120 receives the signal of the charging unit 120 to check whether or not the direct current power is input from the rectifier 160 to the charging unit 120. As the checking result, when the direct current power is input to the charging unit 120, the power transmitting controller 210 controls the charging unit 120 to charge the battery 130 with the direct current power.

In addition, the power transmitting controller 210 receives the signal of the charging unit 120 to determine the power charging status of the battery 130, and generates the charging status signal including the determined power charging status. The generated charging status signal is transmitted to the outside through the first signal transmitting unit 180 and the power receiving coil 150.

Further, when the power charging of the battery 130 is completed, the power transmitting controller 210 generates the charging status signal indicating that the power charging is completed, and the generated charging status signal is transmitted to the outside through the first signal transmitting unit 180 and the power receiving coil 150.

Furthermore, the power transmitting controller 210 controls the charging unit 120 to stop the charging of the battery 130 with the direct current power such that the battery 130 is not overcharged.

Meanwhile, the operation of wirelessly transmitting the power by the power transmitting unit 200 through the power transmitting coil 240 to the external power receiving device is the same as that in the aforementioned embodiments, and, thus, detailed description thereof will not be repeated.

Figure 6A:
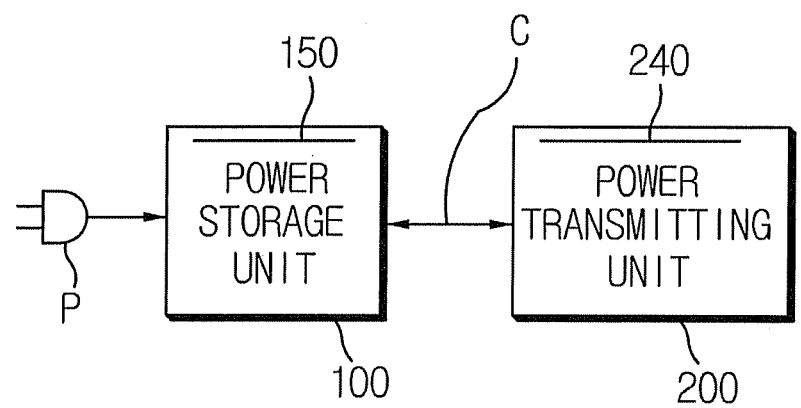
FIGS. 6A to 6C are diagrams describing usage examples of the another embodiment of the wireless power transmitting device of the present invention.

Similarly to the aforementioned embodiments, in the another embodiment of the wireless transmitting device of the present invention, the power charging unit 100 and the power transmitting unit 200 may be separated from each other, as illustrated in FIG. 6A, and the power charging unit 100 converts the alternating current power input through the power plug P or the power receiving coil 150 into the direct current power to charge the battery. Furthermore, the power charging unit 100 and the power transmitting unit 200 may be connected by the cable C to allow the direct current power charged in the power charging unit 100 to be supplied to the power transmitting unit 200.

Figure 6B:
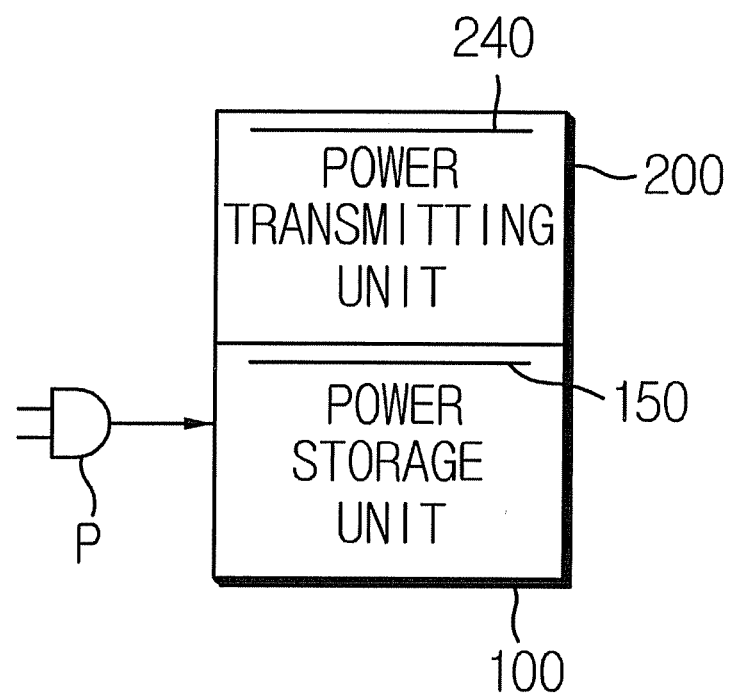

In addition, according to another alternative embodiment of the wireless power transmitting device of the present invention, the power charging unit 100 and the power transmitting unit 200 may be integrally installed in a single case, as illustrated in FIG. 6B.

Figure 6C:
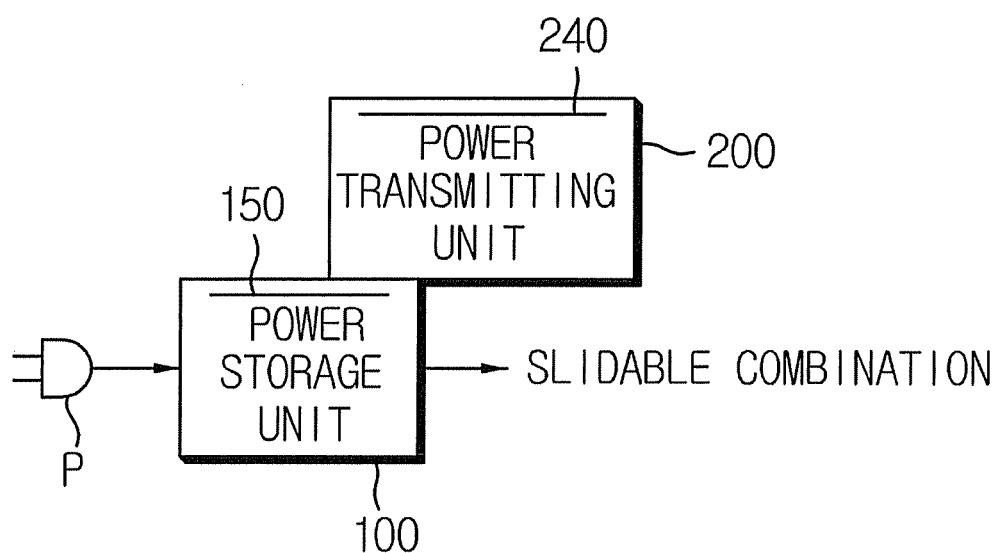

In another alternative embodiment of the wireless power transmitting device of the present invention, the power charging unit 100 and the power transmitting unit 200 may be separated, and slidably combined with each other, as illustrated in FIG. 6C. Moreover, when the power charging unit 100 and the power transmitting unit 200 are slidably combined, the power charging unit and the power transmitting unit may be connected by the contact point (not illustrated in the drawing) to allow the power charging unit 100 to supply the operating power to the power transmitting unit 200.

In the another embodiment of the present invention, it has been described that the operation of charging the battery 130 with the power and the operation of wirelessly transmitting the power through the power transmitting coil 240 have been separately performed by the power transmitting controller 210.

In implementing the present invention, the operation of charging the battery 130 with the power and the operation of wirelessly transmitting the power through the power transmitting coil 240 may be simultaneously performed by the power transmitting controller 210.

Figure 7:
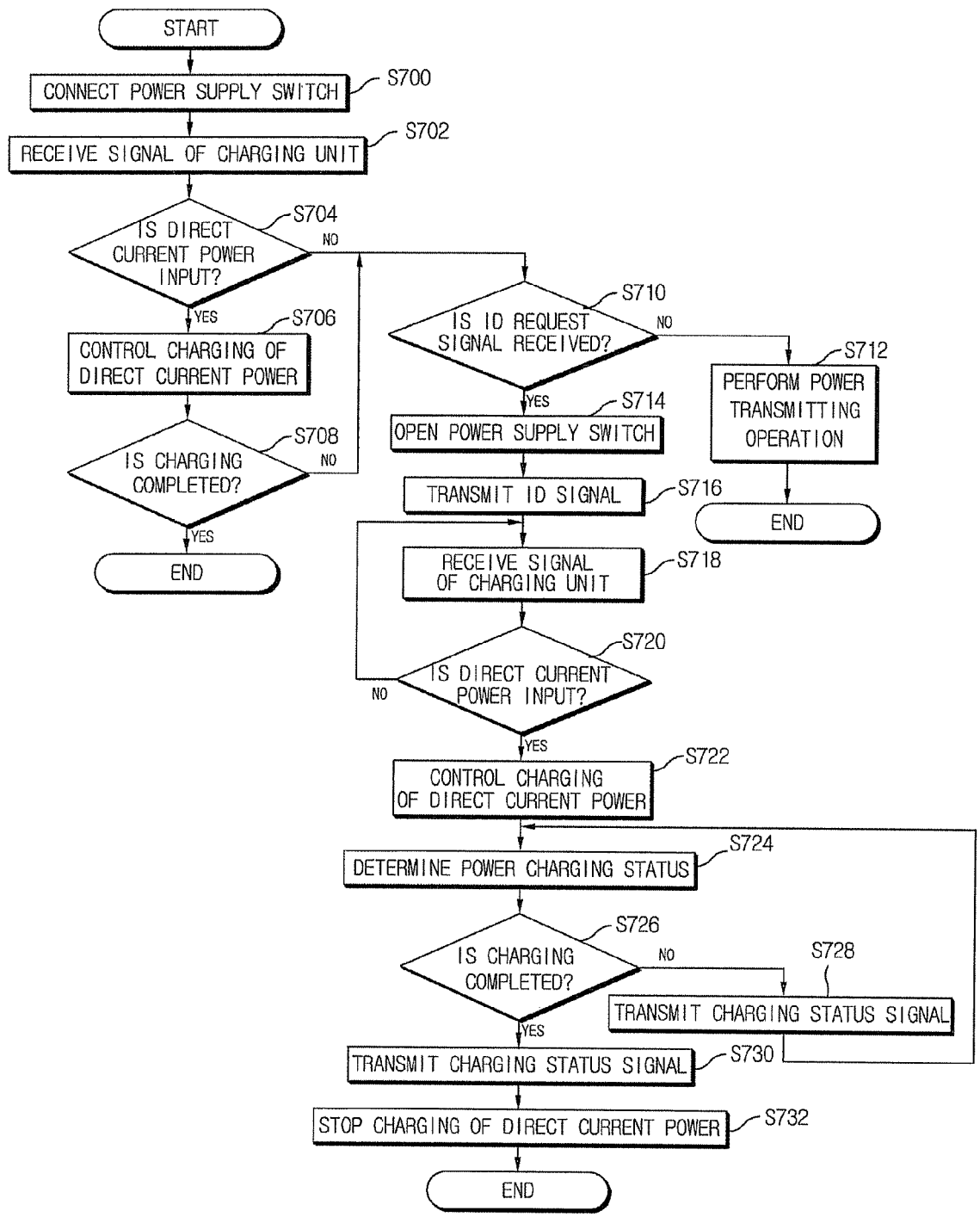
FIG. 7 is a signal flowchart illustrating an operation of the power transmitting controller according to another embodiment of the method for wirelessly transmitting a power of the present invention.

FIG. 7 is a signal flowchart illustrating an operation of the power transmitting controller 210 according to another embodiment of the method for wirelessly transmitting a power of the present invention. Referring to FIG. 7, the power transmitting controller 210 firstly connects the power supply switch 140 (S700).

The alternating current power input from the outside through the power plug P is converted into the direct current power by the alternating/direct current converter 110, and the converted direct current power is input to the charging unit 120 through the power supply switch 140.

In this state, the power transmitting controller 210 receives the signal of the charging unit 120 (S702), and determines whether or not the direct current power is input by using the received signal of the charging unit 120 (S704).

When it is determined that the direct current power is input, the power transmitting controller 210 controls the charging unit 120 to charge the battery 130 with the direct current power (S706).

Further, the power transmitting controller 210 determines whether or not the charging of the battery 130 with the direct current power is completed (S708), and ends the operation of charging the battery 130 with the direct current power when the charging is completed.

Meanwhile, when the direct current power is not input in the operation S704, or when the charging is not completed in the operation S708, the power transmitting controller 210 receives the received signal from the first signal receiving unit 170 to determine whether or not the ID request signal is received (S710).

When it is determined that the ID request signal is not received, the power transmitting controller 210 performs the power transmitting operation (S712).

Here, the power transmitting operation of the operation S712 is the same as that in FIG. 4, and, thus, detailed description thereof will not be repeated.

When it is determined that the ID request signal is received in the operation S710, the power transmitting controller 210 opens the power supply switch 140 to block the direct current power output from the alternating/direct current converter 140 not to be input to the charging unit 120 (S714).

Further, the power transmitting controller 210 generates the unique ID signal, and the generated ID signal is transmitted to the outside through the first signal transmitting unit 180 and the power receiving coil 150 (S716).

In this state, the power transmitting controller 210 receives the signal of the charging unit 120 (S718), and determines whether the direct current power is input by using the received signal of the charging unit 120 (S720).

That is, when the external wireless power transmitting device wirelessly transmits the power signal, the power receiving coil 150 receives the transmitted power signal, and the rectifier 160 converts the received power signal into the direct current power to output the converted direct current power to the charging unit 120. The power transmitting controller 210 receives the signal of the charging unit 120 to determine whether or not the direct current power is input to the charging unit 120 from the rectifier 160.

When it is determined that the direct current power is input to the charging unit 120, the power transmitting controller 210 controls the charging unit 120 to charge the battery 130 with the direct current power (S722).

Furthermore, the power transmitting controller 210 receives the signal of the charging unit 120 to determine the power charging status of the battery 130 (S724), and determines whether or not the power charging of the battery 130 is completed (S726).

When the power charging of the battery 130 is not completed; the power transmitting controller 210 generates the charging status signal including the power charging status of the battery 130. The generated charging status signal is transmitted to the outside through the first signal transmitting unit 180 and the power receiving coil 150 (S728), and the power transmitting controller is returned to the operation S724 to repeatedly perform the operation of determining the power charging status of the battery 130.

In this state, when the power charging of the battery 130 is completed, the power transmitting controller 210 generates a charging status signal including power charging completion information of the battery 130, and the generated charging status signal is transmitted to the outside through the power receiving coil 150 (S730).

Moreover, the power transmitting controller 210 controls the charging unit 120 not to charge the battery 130 with the direct current power (S732), and ends the power charging operation.

Figure 8:
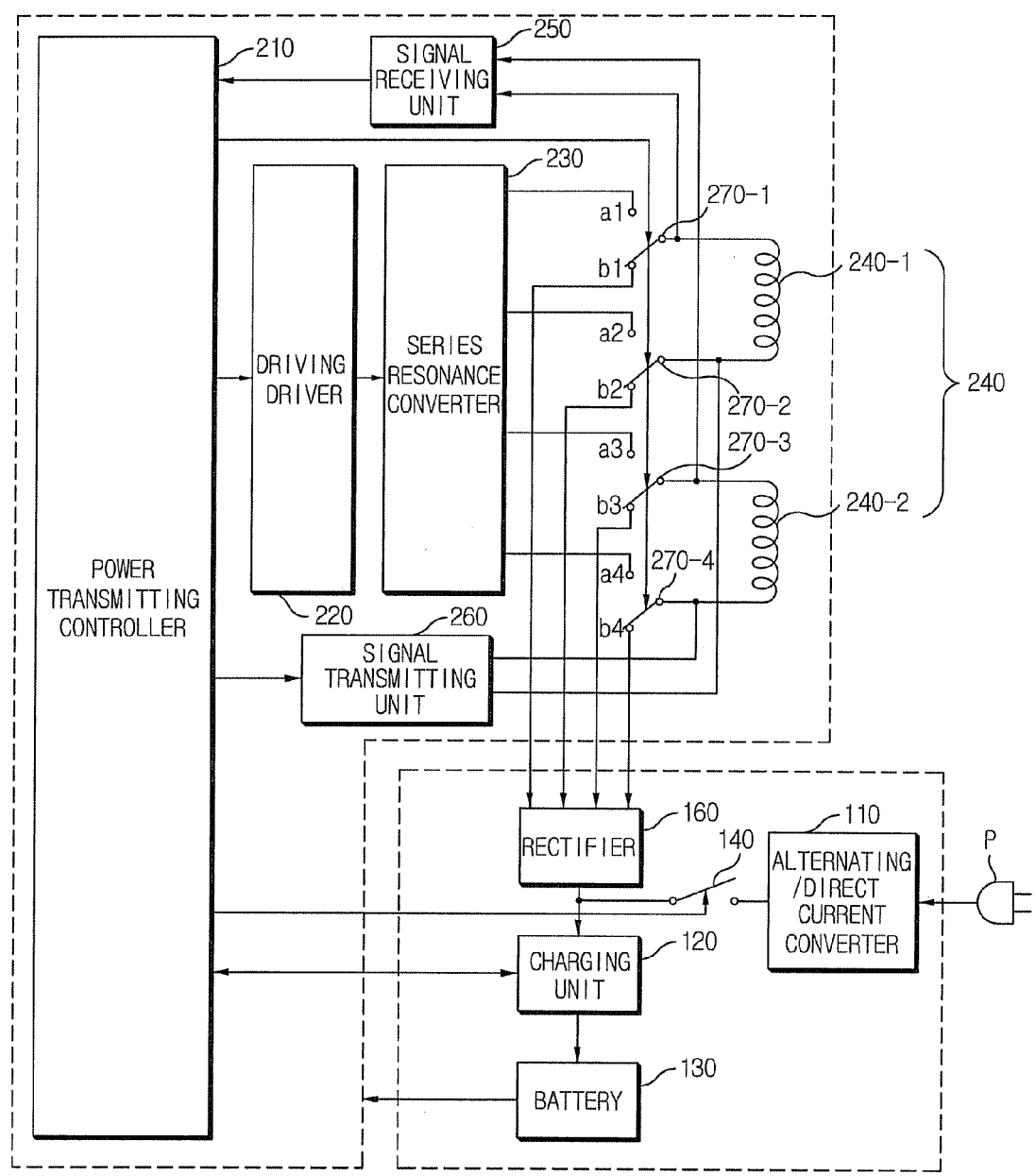
FIG. 8 is a block diagram illustrating a configuration of still another embodiment of the wireless power transmitting device of the present invention.

FIG. 8 is a block diagram illustrating a configuration of still another embodiment of the wireless power transmitting device of the present invention. Referring to FIG. 8, in the still another embodiment of the present invention, transmission/reception switches 270-1, 270-2, 270-3 and 270-4 that are controlled by the power transmitting controller 210 are provided between the rectifier 160 and the series resonance converter 230 and between the rectifier 160 and the power transmitting coil 240, so that the power transmitting coil 240 is connected to the rectifier 160 or the series resonance converter 230 according to the switching of the transmission/reception switches 270-1, 270-2, 270-3 and 270-4.

That is, by connecting the power transmitting coils 240 to operation terminals of the transmission/reception switches 270-1, 270-2, 270-3 and 270-4, one fixation terminals a1, a2, a3 and a4 of the transmission/reception switches 270-1, 270-2, 270-3 and 270-4 are connected to an output terminal of the series resonance converter 230, and the other fixation terminals b1, b2, b3 and b4 of the transmission/reception switches 270-1, 270-2, 270-3 and 270-4 are connected to an input terminal of the rectifier 160.

In the still another embodiment of the wireless power transmitting device of the present invention having the aforementioned configuration, when the battery 130 is charged with the power, the power transmitting controller 210 firstly connects the power supply switch 140. The alternating current power input from the outside through the external power plug P is converted into the direct current power by the alternating/direct current converter 110, and is input to the charging unit 120 through the power supply switch 140.

In this state, the power transmitting controller 210 receives the signal of the charging unit 120 to determine whether or not the direct current power is input, and controls the charging unit 120 to charge the battery 130 with the direct current power when it is determined that the direct current power is input.

Moreover, the power transmitting controller 210 receives the received signal of the signal receiving unit 250 to determine whether or not the ID request signal is received.

When the ID request signal is received, the power transmitting controller 210 firstly opens the power supply switch 140 to block the direct current output from the alternating/direct current converter 110 not to be input to the charging unit 120.

In addition, the power transmitting controller 210 generates the ID signal, and the generated ID signal is transmitted through the signal transmitting unit 260 and the power transmitting coil 240. Further, the power transmitting controller 210 controls the transmission/reception switches 270-1, 270-2, 270-3 and 270-4 to connect the operation terminals to the other fixation terminals b1, b2, b3 and b4.

In such a state, when the external wireless power transmitting device wirelessly transmits the power, the transmitted power is received by the power transmitting coil 240, the received power is converted into the direct current power by the rectifier 160, and then the converted power is output to the charging unit 120.

Moreover, the power transmitting controller 210 receives the signal of the charging unit 120 to check whether or not the direct current power is input to the charging unit 120 from the rectifier 160, and controls the charging unit 120 to charge the battery 130 with the direct current power when it is checked that the direct current power is input.

In addition, the power transmitting controller 210 determines the power charging status of the battery 130 by using the signal of the charging unit 120, and generates the charging status signal including the determined power charging status. The generated charging status signal is transmitted to the outside through the signal transmitting unit 260 and the power transmitting coil 240.

Meanwhile, when the power transmitting unit 200 wirelessly transmits the power to the outside, the power transmitting controller 210 controls the transmission/reception switches 270-1, 270-2, 270-3 and 270-4 to connect the operation terminals to the one fixation terminals a1, a2, a3 and a4.

As stated above, the operation of connecting the operation terminals of the transmission/reception switches 270-1, 270-2, 270-3 and 270-4 to the one fixation terminals a1, a2, a3 and a4 and then wirelessly transmitting the power to the outside is the same as that in the aforementioned embodiments, and, thus, detailed description thereof will not be repeated.

Figure 9A:
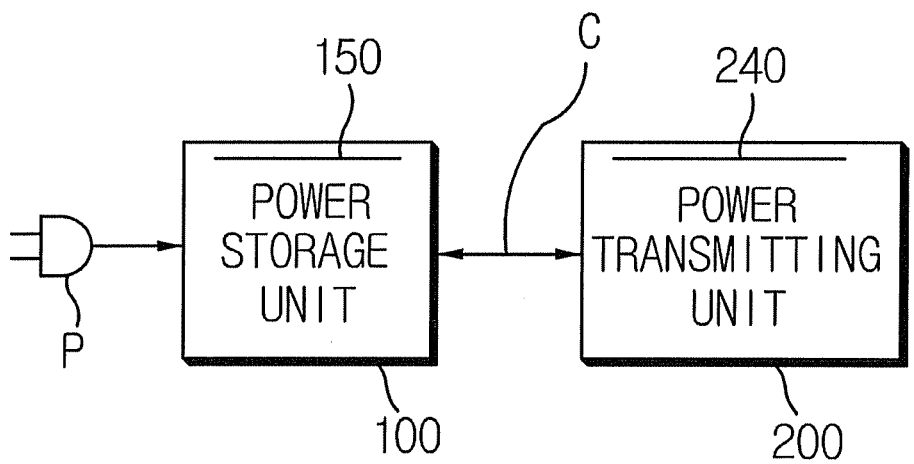
FIGS. 9A to 9C are diagrams describing usage examples of the still another embodiment of the wireless power transmitting device of the present invention.

Similarly to the aforementioned embodiments, in the still another embodiment of the wireless power transmitting device of the present invention, the power charging unit 100 and the power transmitting unit 200 may be separated from each other, as illustrated in FIG. 9A, and the power charging unit 100 converts the alternating current power input through the power plug P or the power receiving coil 240 into the direct current power to charge the battery. Further, the power charging unit 100 and the power transmitting unit 200 may be connected by the cable C to supply the direct current power charged in the power charging unit 100 to the power transmitting unit 200.

Figure 9B:
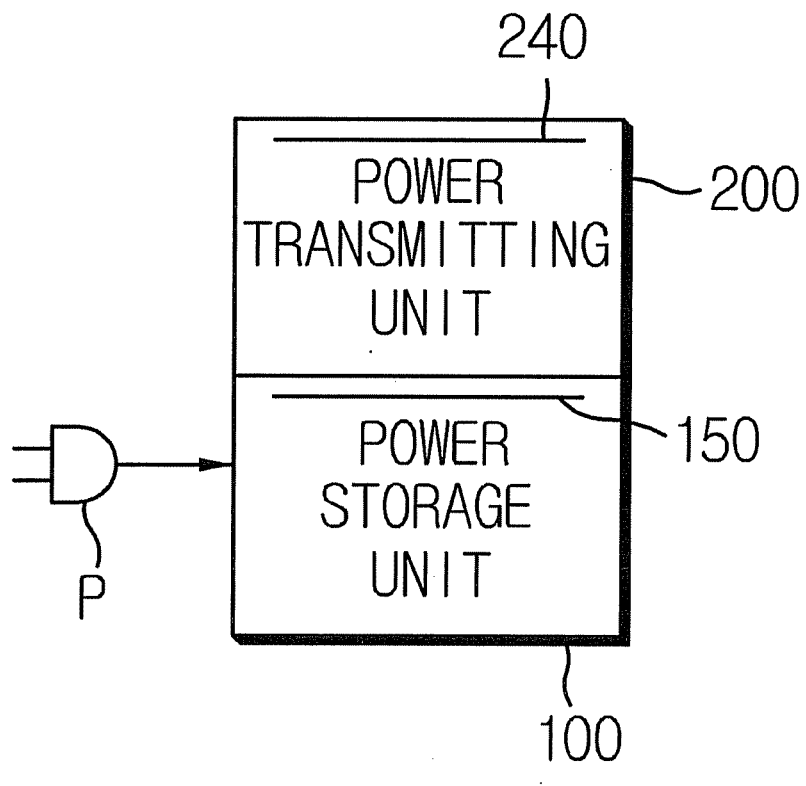

Furthermore, in still another alternative embodiment of the wireless power transmitting device of the present invention, the power charging unit 100 and the power transmitting unit 200 may be integrally provided in a single case, as illustrated in FIG. 9B.

Figure 9C:
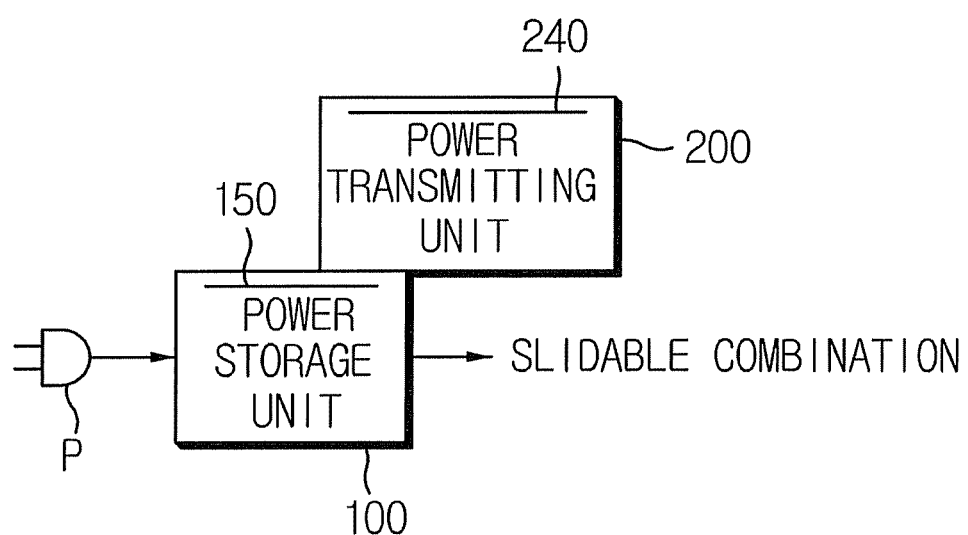

Moreover, in still another alternative embodiment of the wireless power transmitting device of the present invention, the power charging unit 100 and the power transmitting unit 200 may be separated from each other, and slidably combined with each other, as illustrated in FIG. 9C. In addition, when the power charging unit 100 and the power transmitting unit 200 are slidably combined, the power charging unit and the power transmitting unit may be connected through a contact point (not illustrated in the drawing) to allow the power charging unit 100 to supply the operating power to the power transmitting unit 200.

Figure 10:
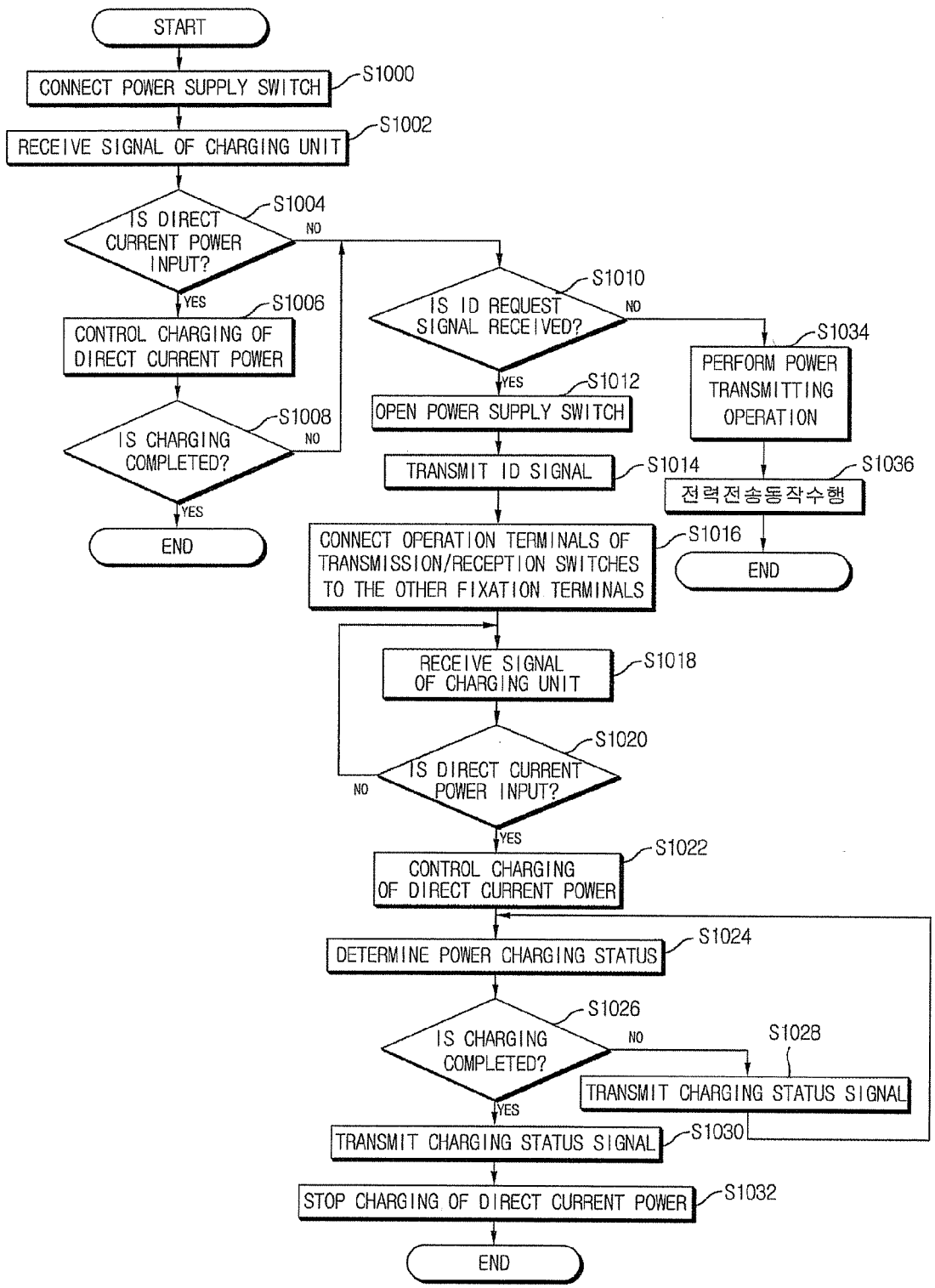
FIG. 10 is a signal flowchart illustrating an operation of the power transmitting controller according to still another embodiment of the method for wirelessly transmitting a power of the present invention.

FIG. 10 is a signal flowchart illustrating an operation of the power transmitting controller according to the still another embodiment of the method for wirelessly transmitting a power the present invention. Referring to FIG. 10, the power transmitting controller 210 firstly connects the power supply switch 140 (S1000).

The direct current power output from the alternating/direct current converter 110 is input to the charging unit 120 through the power supply switch 140.

Furthermore, the power transmitting controller 210 receives the signal of the charging unit 120 (S1002), and determines whether or not the direct current power is input by using the received signal of the charging unit 120 (S1004).

When it is determined that the direct current power is input, the power transmitting controller 210 controls the charging unit 120 to charge the battery 130 with the direct current power (S1006).

In this state, the power transmitting controller 210 determines whether or not the charging of the battery 130 with the direct current power is completed (S1008), and ends the operation of charging the battery 130 with the direct current power when the charging is completed.

Meanwhile, when the direct current power is not input in the operation S1004, or when the charging is not completed in the operation S1008, the power transmitting controller 210 receives the received signal of the signal receiving unit 250 to determine whether or not the ID request signal is received (S1010).

When it is determined that the ID request signal is received, the power transmitting controller 210 opens the power supply switch 140 to block the direct current power output from the alternating/direct current converter 140 not to be input to the charging unit 120 (S1012). Further, the power transmitting controller 210 generates the unique ID signal, and the generated ID signal is transmitted to the outside through the signal transmitting unit 260 and the power transmitting coil 240 (S1014).

Moreover, the power transmitting controller 210 controls the transmission/reception switches 270-1, 270-2, 270-3 and 270-4 to connect the operation terminals to the other fixation terminals b1, b2, b3 and b4 (S1016), receives the signal of the charging unit 120 (S1018), and then determines whether or not the direct current power is input by using the received signal of the charging unit 120 (S1020).

When the direct current power is input to the charging unit 120, the power transmitting controller 210 controls the charging unit 120 to charge the battery 130 with the direct current power (S1022).

In addition, the power transmitting controller 210 receives the signal of the charging unit 120 to determine the power charging status of the battery 130 (S1024), and determines whether or not the power charging of the battery 130 is completed (S1026).

When the power charging of the battery 130 is not completed, the power transmitting controller 210 controls the first signal transmitting unit 180 to generate the charging status signal including the current power charging status of the battery 130, and the generated charging status signal is transmitted to the outside through the power transmitting coil 240 (S1028). The power transmitting controller is returned to the operation S1024 to repeatedly perform the operation of determining the power charging status of the battery 130.

In this state, when the power charging of the battery 130 is completed, the power transmitting controller 210 generates the charging status signal including the power charging completion information of the battery 130, and the generated charging status signal is transmitted to the outside through the power transmitting coil 240 (S1030).

Further, the power transmitting controller 210 controls the charging unit 120 not to charge the battery 130 with the power (S1032), and ends the power charging operation.

Meanwhile, when the ID request signal is not received in the operation S1010, the power transmitting controller 210 controls the transmission/reception switches 270-1, 270-2, 270-3 and 270-4 to connect the operation terminals to the one fixation terminals a1, a2, a3 and a4 (S1034), and performs the power transmitting operation (S1036).

Here, the operation of wirelessly transmitting the power by the power transmitting unit 200 is the same as that in the aforementioned embodiments, and, thus, detailed operation description thereof will not be repeated.

In the still another embodiment of the present invention, it has been described that the operation of charging the battery 130 with the power and the operation of wirelessly transmitting the power through the power transmitting coil 240 have been separately performed by the power transmitting controller 210.

However, when the battery 130 is charged with the direct current power by using the alternating current power input through the power plug P, the operation of charging the battery 130 with the power and the operation of wirelessly transmitting through the power transmitting coil 240 may be simultaneously performed by the power transmitting controller 210.

As described above, the present invention has been described in detail in connection with the representative embodiments, but it should be understood to those skilled in the art that the aforementioned embodiments can be modified in various manners without departing from the scope of the present invention.

Therefore, the scope of the present invention is not limited to the aforementioned embodiments, and should be decided by the appended claims and their equivalents.

The invention claimed is:

1. A wireless power transmitting device comprising:
a power storage unit configured to store a direct current power; and
a power transmitting unit configured to be operated by the direct current power stored in the power storage unit and to wirelessly transmit the power to a power receiving device,
wherein the power storage unit and the power transmitting unit are respectively provided in separate cases, and
wherein the power storage unit and the power transmitting unit are connected by a cable or combined slidably.

2. The wireless power transmitting device of claim 1, wherein the power storage unit includes:
an alternating/direct current converter configured to convert an external alternating current power to a direct current power;
a battery configured to store the direct current power and to output the stored direct current power to the power transmitting unit; and
a charging unit configured to charge the battery with the direct current power converted by the alternating/direct current converter under the control of the power transmitting unit.

3. The wireless power transmitting device of claim 1, wherein the power transmitting unit includes:
a power transmitting coil configured to wirelessly transmit an alternating current power; and
a power transmitting controller configured to apply the alternating current power to the power transmitting coil to control such that the applied alternating current is transmitted.

4. The wireless power transmitting device of claim 3, wherein the power transmitting unit further includes:
a driving driver configured to amplify a PWM driving signal generated by the power transmitting controller; and
a series resonance type converter configured to switch the direct current power stored in the power storage unit to generate the alternating current power in response to the PWM signal amplified by the driving driver, and to apply the generated alternating current power to the power transmitting coil.

5. The wireless power transmitting device of claim 3, wherein the power transmitting unit further includes:
a second signal receiving unit configured to receive a signal transmitted from the power receiving device through the power transmitting coil to provide the received signal to the power transmitting controller; and
a second signal transmitting unit configured to transmit a signal generated by the power transmitting controller to the power receiving device through the power transmitting coil.

6. A wireless power transmitting device comprising:
a power storage unit configured to store a direct current power; and
a power transmitting unit configured to be operated by the direct current power stored in the power storage unit and to wirelessly transmit the power to a power receiving device,
wherein the power storage unit includes:
a power receiving coil configured to wirelessly receive an external alternating current power;
a rectifier configured to rectify the alternating current power received by the power receiving coil to the direct current power;
a battery configured to store the direct current power and to output the stored direct current power to the power transmitting unit; and
a charging unit configured to charge the battery with the direct current power rectified by the rectifier under the control of the power transmitting unit, and
wherein the power storage unit further includes:
a first signal receiving unit configured to receive a signal transmitted from an external wireless power transmitting device through the power receiving coil to provide the received signal to the power transmitting unit; and
a first signal transmitting unit configured to transmit a signal generated by the power transmitting unit to the outside through the power receiving coil.

7. The wireless power transmitting device of claim 6, wherein the power storage unit further includes:
an alternating/direct current converter configured to convert the external alternating current power into the direct current power; and
a power transmitting switch that is provided between the alternating/direct current converter and the charging unit to be switched under the control of the power transmitting unit.

8. A method for wirelessly transmitting a power, the method comprising:
charging a battery with a power received by a power receiving coil from the outside under the control of a power transmitting controller;
charging, by the power transmitting controller, the battery with an output power of an alternating/direct current converter when the power is not received by the power receiving coil from the outside; and
applying the power charged in the battery to a power transmitting coil under the control of the power transmitting controller to wirelessly transmit the power to the outside.

9. The method of claim 8,
wherein the step of charging a battery with a power received by a power receiving coil from the outside under the control of a power transmitting controller includes:
transmitting, by the power transmitting controller, an ID signal when an ID request signal is received, and determining whether the power is received through the power receiving coil; and
when the power is received, charging the battery with the received power.

10. The method of claim 8, further comprising:
determining, by the power transmitting controller, a power charging status of the battery; and
generating, by the power transmitting controller, a charging status signal including the power charging status to transmit the generated charging status signal to the outside through the power receiving coil.

11. The method of claim 8,
wherein the step of applying the power charged in the battery to a power transmitting coil under the control of the power transmitting controller to wirelessly transmit the power to the outside includes:
detecting a power receiving device through the power transmitting coil; and
converting the power charged in the battery into an alternating current power under the control of the power transmitting controller when the power receiving device is detected, and applying the converted alternating current power to the power transmitting coil to wirelessly transmit the alternating current power to the outside.

12. A wireless power transmitting device comprises:
a power transmitting coil configured to wirelessly transmit a power and to wirelessly receive the power;
a power storage unit configured to store the power received by the power transmitting coil; and
a power transmitting controller configured to control the power received by the power transmitting coil to be stored in the power storage unit, and to apply the power stored in the power storage unit to the power transmitting coil to wirelessly transmit the power to the outside,
wherein the power storage unit and the power transmitting controller are respectively provided in separate cases, and
wherein the power storage unit and the power transmitting controller are connected by a cable or combined slidably.

13. The wireless power transmitting device of claim 12, wherein the power storage unit includes:
a rectifier configured to rectify the power received by the power transmitting coil to a direct current power;
a battery configured to store the power; and
a charging unit configured to charge the battery with the direct current power rectified by the rectifier under the control of the power transmitting controller.

14. The wireless power transmitting device of claim 13, wherein the power storage unit further includes:
an alternating/direct current converter configured to convert an alternating current power into a direct current power; and
a power transmitting switch configured to output the converted direct current power by the alternating/direct current converter to the charging unit under the control of power transmitting controller.

15. The wireless power transmitting device of claim 12, wherein the power storage unit further includes:
a driving driver configured to amplify a PWM driving signal generated by the power transmitting controller;
a series resonance converter configured to switch the direct current power stored in the power storage unit to generate the alternating current power in response to the PWM signal amplified by the driving driver, and to apply the generated alternating current power to the power transmitting coil; and
a transmitting/receiving switch configured to be switched under the control of the power transmitting controller to apply the alternating current power generated by the series resonance converter to the power transmitting coil, and to output the power received by the power transmitting coil to the power storage unit.

16. A method for wirelessly transmitting a power, the method comprising:
storing a power received through a power transmitting coil from the outside in a power storage unit under the control of a power transmitting controller; and
charging, by the power transmitting controller, the power storage unit with an output power of an alternating/direct current converter when the power is not received by the power transmitting coil from the outside; and
applying the power stored in the power storage unit to the power transmitting coil to wirelessly transmit the power to the outside under the control of the power transmitting controller.

17. The method of claim 16,
wherein the step of storing a power received through a power transmitting coil from the outside in a power storage unit under the control of a power transmitting controller includes:
transmitting, by the power transmitting controller, an ID signal through a power transmitting coil when an ID request signal is received, and determining whether the power is received through the power transmitting coil; and
when the power is received, charging a battery with the received power.

18. The method of claim 16, further comprising:
determining, by the power transmitting controller, a power charging status of the power storage unit; and
generating, by the power transmitting controller, a charging status signal including the power charge status to transmit the generated charging status signal to the outside through the power receiving coil.

19. The method of claim 16,
wherein the step of applying the power stored in the power storage unit to the power transmitting coil to wirelessly transmit the power to the outside under the control of the power transmitting controller includes:
detecting a power receiving device through the power transmitting coil: and
applying the power charged in the power storage unit to the power transmitting coil to wirelessly transmit the power to the outside under the control of the power transmitting controller when the power receiving device is detected.

* * * * *